(12) United States Patent
Huffman

(10) Patent No.: US 6,648,262 B1
(45) Date of Patent: Nov. 18, 2003

(54) LINE REMOVAL DEVICE AND METHOD

(76) Inventor: Carl T. Huffman, 5212 Dylan Way, Summerfield, NC (US) 27358

( * ) Notice: Subject to any disclaimer, the term of this patent is extended or adjusted under 35 U.S.C. 154(b) by 75 days.

(21) Appl. No.: 09/955,786

(22) Filed: Sep. 20, 2001

(51) Int. Cl.$^7$ .......................... B65H 75/40; B65H 54/40
(52) U.S. Cl. ................. 242/390.8; 242/405.3; 242/486.6; 242/902
(58) Field of Search .............. 242/902, 390.8, 242/405.3, 486.6

(56) References Cited

U.S. PATENT DOCUMENTS

| | | | | |
|---|---|---|---|---|
| 2,459,963 A | * | 1/1949 | Roark | 242/902 |
| 4,196,864 A | * | 4/1980 | Cole | 242/902 |
| 5,277,350 A | * | 1/1994 | Thornbury | 242/390.8 |
| 5,906,329 A | * | 5/1999 | Wesley | 242/902 |
| 6,102,319 A | | 8/2000 | Annabel et al. | 242/362 |
| 6,398,147 B1 | * | 6/2002 | Fredrickson | 242/390.8 |

OTHER PUBLICATIONS

Capt. Harry's Fishing Supply catalog 25th Edition, p. 49.
Johnny Morris Offshore Angler 2000 catalog, p. 29.

* cited by examiner

Primary Examiner—John M. Jillions

(57) ABSTRACT

The invention herein pertains to a device and method for unwinding and removing line from reels such as fishing reels. The device and method described includes a tapered shaft positioned between opposing hubs. The distal hub is threadably joined to the shaft and can be released after winding for convenient removal of the line.

11 Claims, 4 Drawing Sheets

LINE REMOVAL DEVICE AND METHOD

FIELD OF THE INVENTION

The invention herein pertains to line removal devices, and particularly pertains to devices for unwinding line from a fishing reel.

DESCRIPTION OF THE PRIOR ART AND OBJECTIVES OF THE INVENTION

The time consuming and laborious task of manually unwinding old line from fishing reels has been practiced by fishermen and reel repair shop personnel for many years. Recently, automated ways of removing used or old fishing line has been developed employing power tools such as electric drills. It has been common practice in the past to insert a wooden or metal rod in a mechanical or electric drill, attach the end of the line from the reel to the rod, and thereafter activate the drill to wind the line onto the rod. Once the used line has been completely removed from the reel it can be simply discarded with the rod. The line can also be removed from the rod by cutting it off, or painstakingly manually manipulating it therefrom. With the recent growth of fishing tournaments and the explosion of prize money offered, fishing contestants generally rewind their reels daily with new line to prevent line breakage. In addition, reel repair shops generally remove the line from the fishing reel before repairing the same and thereafter rewind the repaired reel with new fishing line.

Thus with the problems, costs, labor and disadvantages of methods of removing old fishing line from reels, the present invention was conceived and one of its objectives is to provide a device and method for conveniently removing the same.

It is still another objective of the present invention to provide a device which can be easily operated by relatively unskilled persons in a quick and efficient manner.

It is yet another objective of the present invention to provide a line removal device which can be affixed to a tool such as an electric drill to save time and labor in the removal process.

It is also another objective of the present invention to provide a line removal device which includes a tapered shaft having opposing hubs thereon.

It is a further objective of the present invention to provide a line removal device which is relatively inexpensive to manufacture and which allows quick removal of the old line wound thereon.

Various other objectives and advantages of the present invention will become apparent to those skilled in the art as a more detailed description is set forth below.

SUMMARY OF THE INVENTION

Many fishing reels hold hundreds of meters of fishing line. Such reels may hold six hundred meters of a fifty pound test, nylon monofilament line which can develop defects and weaknesses therealong during use. To a top contestant in a fishing contest, line breakage can result in the loss of tens of thousands or more dollars over a single weekend. Thus, to better insure the chances of a large purse, such fishermen rewind their reels daily with new line. To assist in the unwinding and removal of old fishing line, the present invention provides a removal device consisting of a tapered shaft affixed between two opposing hubs, one of said hubs being releasable, and each having dome-like inner faces. At the proximal end of the tapered shaft a winding stud is affixed for placement in the chuck of a typical electric hand drill. On the opposite end of the shaft, exterior of the distal hub is a rotatable handle for holding the removal tool during operation.

The method of use includes attaching the old line from a fishing reel to the tapered shaft. An electric drill joined to the winding stud is held in one hand and the handle held in the other. When the drill is activated, the device rotates and the line is quickly wound from the reel onto the removal device. Once the old line has been completely removed from the reel, the releasably, distal hub proximate the handle can then be rotated relative to the shaft where it disengages therefrom and can then be slid over the handle for removal purposes. Next, the old bundle of line on the shaft is grasped and is manually rotated in a direction opposite that used during winding. This rotation or twisting action loosens the line from the tapered shaft. Next, the bundle is manually urged from the shaft, across the handle for proper disposal. Should the line be in good (new) condition it can be rewound on the fishing reel, such as may occur after a fishing reel repair without removing it from the tapered shaft.

DETAILED DESCRIPTION OF THE PREFERRED EMBODIMENT AND OPERATION OF THE INVENTION

Figure 1:
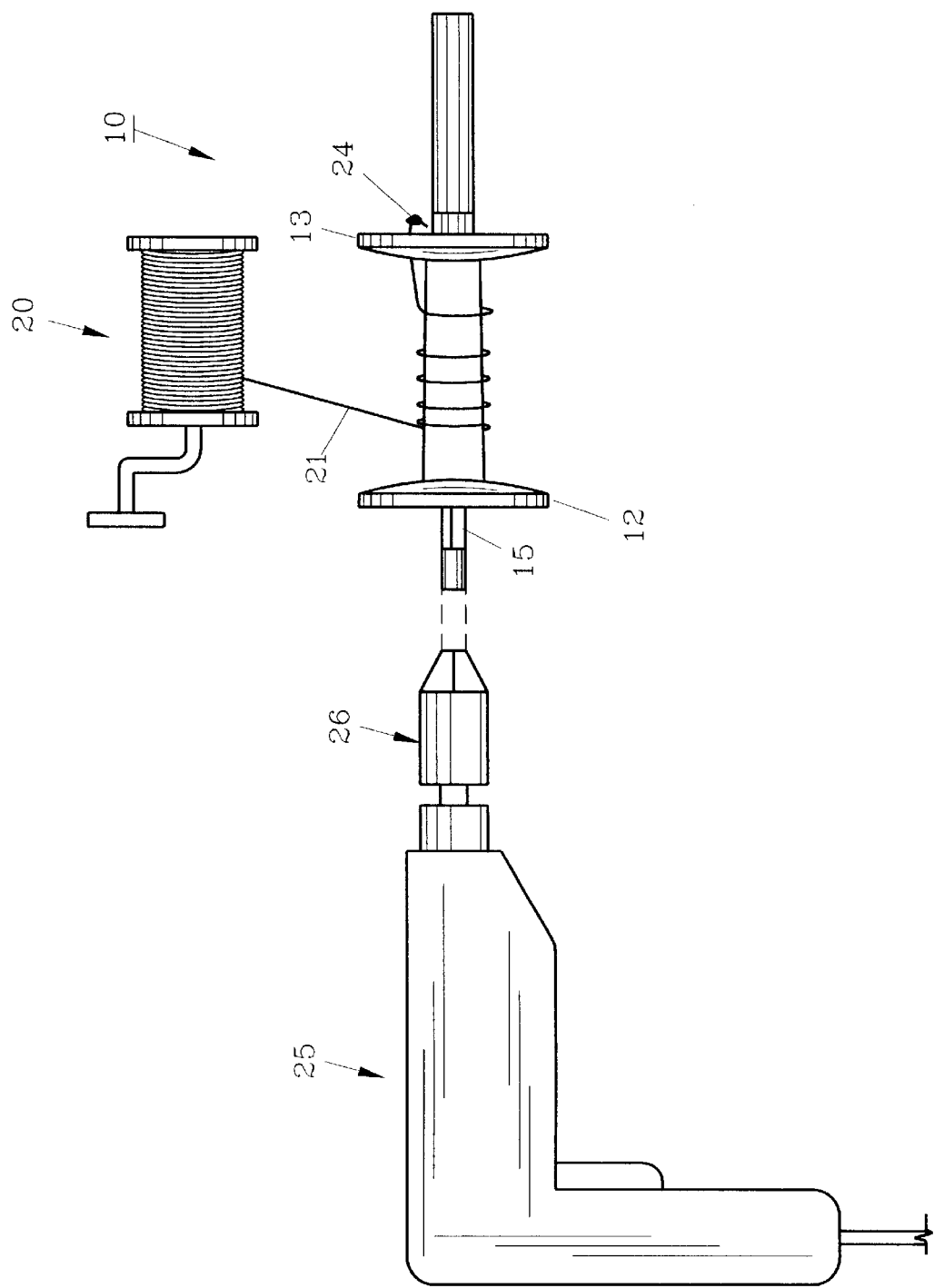
FIG. 1 demonstrates a line removal tool of the invention for a typical fishing reel with the electric drill exploded therefrom.
Figure 2:
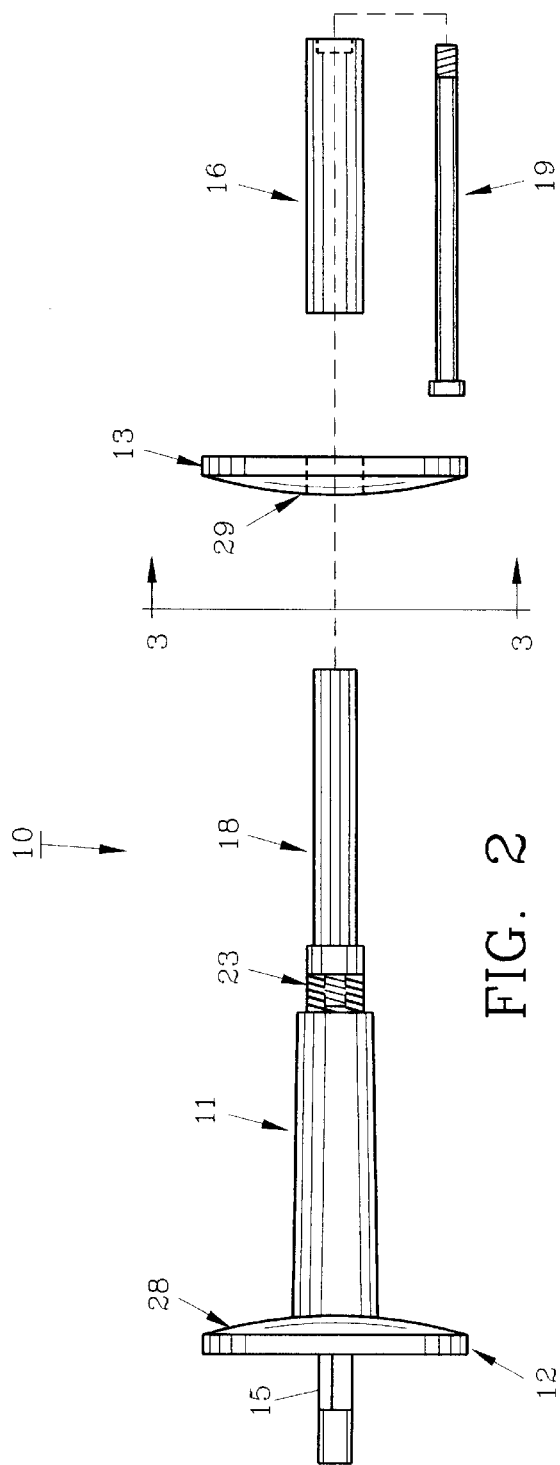
FIG. 2 shows the line removal tool as seen in FIG. 1 but with the releasable hub and handle removed.
Figure 3:
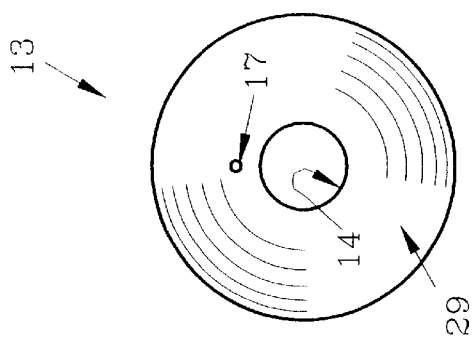
FIG. 3 depicts a view of the interior face of the releasable hub as shown along lines 3—3 in FIG. 2.
Figure 4:
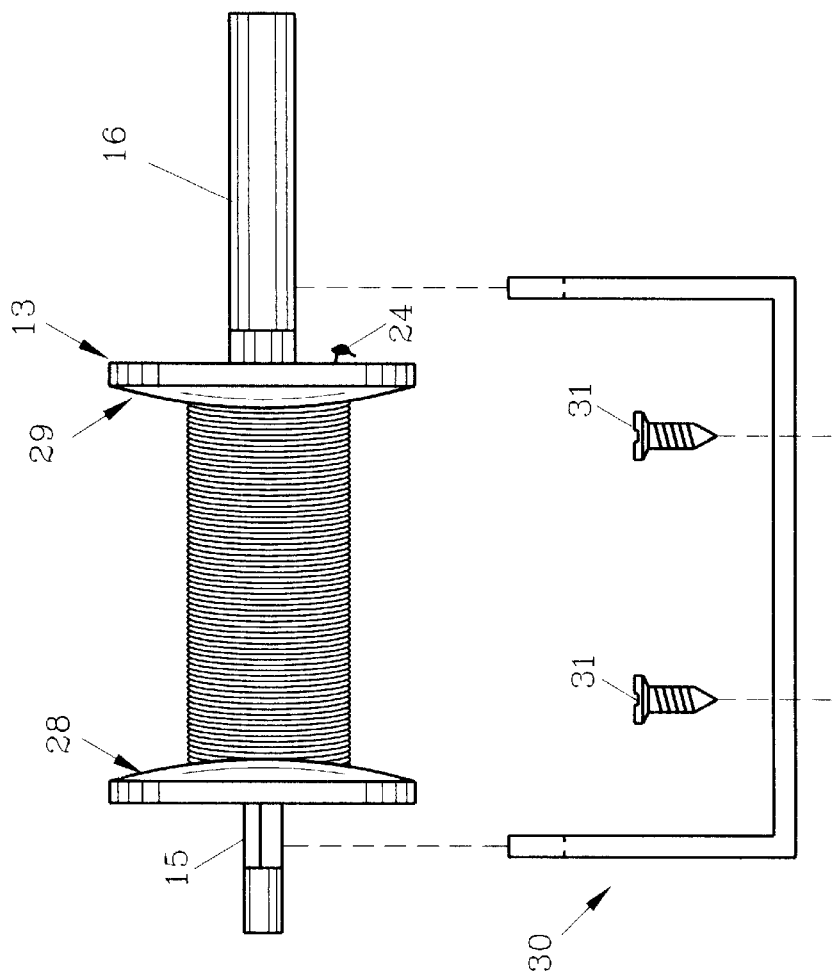
FIG. 4 features the removal tool as shown in FIG. 1 with a large amount of line wound thereon as removed from a holding bracket.

For a better understanding of the invention and its operation, turning now to the drawings, FIG. 1 demonstrates a typical fishing reel 20 apart from a fishing rod (not seen) having several hundred meters of conventional monofilament nylon fishing line 21 wound thereon. Line 21 is shown with a few revolutions on preferred line removal device 10 as shown, disengaged from conventional power tool or electric drill 25, a standard electric drill having a ⅜ inch (0.95 cm) chuck capacity. Line removal device 10 is preferably made of aluminum and as shown in FIG. 2 includes main shaft 11 which is tapered from (inside) rigidly affixed proximal hub 12, with a diameter of approximately one inch (2.54 cm), along its longitudinal axis to approximately ⅞ inches (2.09 cm) in diameter at its opposite end, proximate (inside) distal releasable hub 13 as seen in. FIGS. 1, 2 and 4. Main shaft 11 is preferably 4 inches in length (10.16 cm). Winding stud 15 is rigidly joined to shaft 11 exterior of proximal hub 12 and preferably has a hex shaped section (in cross section) with a diameter of ⅜ inches (0.95 cm) to fit into chuck 26 of electric hand drill 25 as seen in FIG. 1. Hubs 12, 13 each has a diameter of approximately 3.5 inches (8.89 cm). Winding stud 15 may be for example 1.5 inches in length (3.8 cm) for gripping by chuck 26. Distal, releasable hub 13 is preferably affixed to shaft 11 by interior threads 14 (FIG. 3) which engage shaft threads 23, although other methods and mechanical expedients of joining hub 13 to shaft 11 could be utilized. Releasable hub 13 (FIG. 3) defines aperture 17 which allows line 21 to pass therethrough as shown in FIG. 1 and as explained in more detail below. Hubs 12, 13 have respectively interior faces 28, 29 which are dome-like in appearance (see FIGS. 2–5) to help guide line 21 onto shaft 11 during the operation of line removal tool 10.

In order to conveniently wind line 21 on shaft 11, handle 16 is provided with a length of approximately 4 inches (10.16 cm). Handle 16 acts as a sleeve as it passes over shaft extension 18 (FIGS. 2 and 5) and is held in place by threaded shoulder member 19. Thus, handle 16 can be gripped as shaft 11 and shaft extension 18 which are rigidly joined, rotate during the winding of line 21 around shaft 11.

In certain instances, line removal device 10 may require prolonged periods of use, such as during the unwinding of several reels, one after another. In order to eliminate fatigue of the operator, an optional bracket such as bracket 30 shown in FIG. 4 can be mounted on a work bench or the like by threaded members 31 for convenience purposes although bracket 30 is not a part of the preferred method of operation.

The preferred method of removing line from a reel such as fishing reel 20 shown in FIG. 1 includes the step of attaching line 21 to line removal device 10 by positioning the terminal end of line 21 through aperture 17 in hub 13. A knot 24 preferably is manually tied in the end of line 21 exteriorly of releasable, distal hub 13 to prevent line 21 from slipping out of aperture 17 during operation. Next, winding stud 15 is inserted into a tool such as preferred electric drill 25, although other types of tools could be utilized such as a mechanical (manual) drill (not shown). Electric drill 25 is then activated to rotate line removal device 10 whereby line 21 can then be completely removed (unwound) from reel 20 and wound onto shaft 11, as electric drill 25 is held in one hand and handle 16 is held in the other hand.

Figure 5:
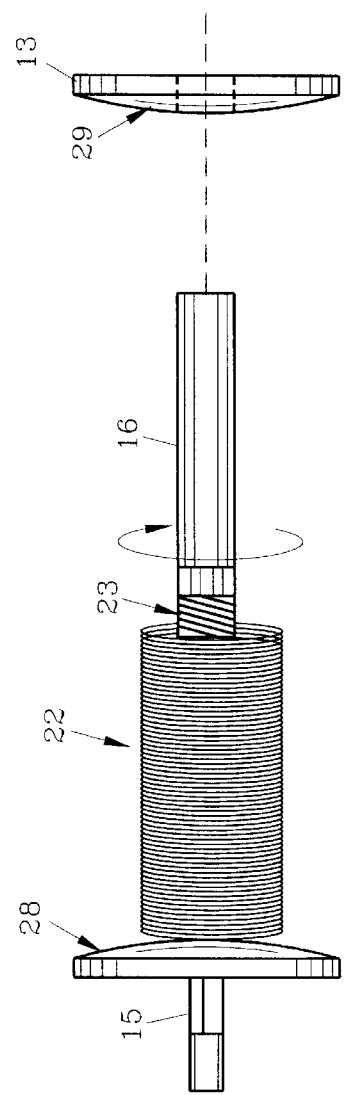
FIG. 5 pictures the removal tool of FIG. 4 but with the releasable hub removed.
Figure 7:
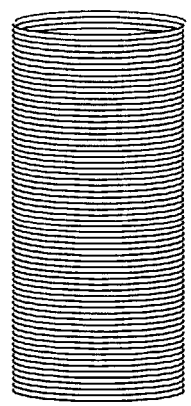
FIG. 7 demonstrates the line bundle as completely removed from the removal tool.
Figure 6:
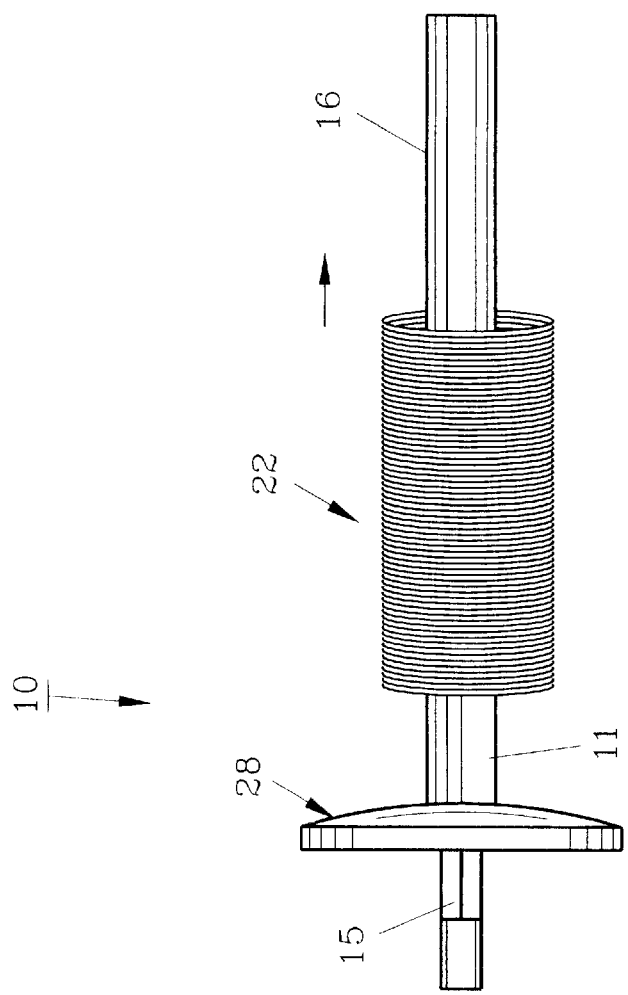
FIG. 6 depicts the removal tool of FIG. 5 during initial sliding of the line bundle therefrom.

Once the winding of line 21 on shaft 11 is complete, the terminal end of line 21 is removed from aperture 17 (FIG. 3) after first removing tied knot 24. Releasable hub 13 as shown in FIG. 3 is then rotated in a clockwise direction for threads 14, 23 to disengage while shaft 11 firmly held. Hub 13 is then slid past (over) handle 16 as shown in FIG. 5. Next, by manually grasping line bundle 22 as seen in FIG. 5 while holding line removal device 10 in a rigid posture, line bundle 22 is manually rotated (twisted) in a clockwise or opposite direction to that used when winding to slightly loosen it from shaft 11. Line bundle 22 can then be easily slid from shaft 11 as shown in FIG. 6 and becomes unsupported as shown in FIG. 7. Line bundle 22 is then preferably discarded and new line wound on reel 20. Thereafter, hub 13 can be retightened on shaft 11 and the fishing line removal process can begin anew for a different reel.

Should it be desired, line bundle 22 can be rewound on a fishing reel without removing it from shaft 11, in certain instances of line bundle 22 being in new or almost new condition, but such is not within the preferred method.

The illustrations and examples provided herein are for explanatory purposes and are not intended to limit the scope of the appended claims.

I claim:

1. A device for unwinding line from a fishing reel comprising: a tapered shaft, a winding stud, said winding stud affixed to aid shaft, a pair of opposing hubs, said hubs mounted on said shaft, one of said hubs being threadable on said shaft, a shaft extension, said shaft extension attached to said shaft proximnate said threadable hub and a handle, said handle slidably mounted on said shaft extension whereby line wound on said shaft can be removed by sliding said wound line therefrom after removing said threadable hub.

2. The device of claim 1 wherein said threadable hub defines a line aperture.

3. The device of claim 1 wherein each of said hubs has a dome-like face.

4. The device of claim 1 wherein said winding stud is hex-shaped.

5. The device of claim 1 further comprising a shoulder member, said shoulder member attached to said shaft, said shoulder member for retaining said handle on said shaft exterior.

6. The device of claim 1 further comprising an electric drill, said drill connected to said winding stud.

7. The device of claim 1 wherein said tapered shaft is smallest in diameter proximate said threadable hub.

8. A method of removing line from a reel with a device having a tapered shaft, a shaft extension, a handle slidably positioned on said shaft extension and a threadable hub attached to said tapered shaft comprising the steps of:

a) winding the line onto the tapered shaft by rotating the tapered shaft;

b) removing the threadable hub from the shaft by sliding the threadable hub over the handle; and c) thereafter sliding the wound line from the shaft over the handle.

9. The method of claim 8 further comprising the step of loosening the wound line by rotating said wound line in an opposite direction to that used to wind the line on the shaft.

10. The method of claim 8 wherein winding the line comprises the step of attaching a tool to the shaft.

11. The method of claim 10 wherein winding the line comprises the step of first attaching the line to the tapered shaft.

\* \* \* \* \*